United States Patent Office 3,198,780
Patented Aug. 3, 1965

3,198,780
LOW TEMPERATURE POLYMERIZATION OF ETHYLENE IN THE PRESENCE OF AN ALUMINUM ALKYL COMPOUND AND OXYGEN CONTAINING COMPOUND
George A. Mortimer, La Marque, and Luigi Boghetich, Texas City, Tex., assignors to Monsanto Company, a corporation of Delaware
No Drawing. Filed Dec. 29, 1961, Ser. No. 163,019
5 Claims. (Cl. 260—94.9)

This invention relates to a process for the low temperature polymerization of ethylene. More particularly it relates to a novel initiator for the production of normally solid polymers of ethylene by catalytic polymerization at high pressures.

Various proposals have been made for polymerizing ethylene, the major objective of which has been the production of polymerized polymers of high tensile strength. It is known that solid polymers of ethylene can be produced by employing elevated pressures such as 1,000 to 2,000 atmospheres and elevated temperatures such as from 200 to 400° C. Various catalysts can be used to initiate the polymerization reaction depending on the product properties desired. Oxygen, numerous peroxides, and azo compounds are commonly used as initiators. The most widely used initiator in the polymerization of ethylene at high pressure is oxygen. However, oxygen has certain disadvantages such as making the reaction more difficult to control, being extremely inefficient at pressures below 15,000 p.s.i. and being usable only at temperature ranges from 160° to 400° C. Various low temperature initiators such as organoaluminum compounds and titanium salts are effective only when the reaction proceeds at low pressure via a Zeigler type polymerization.

The present invention provides a new initiator which combines one agent of a low pressure initiator with a high pressure initiator and improves the efficiency of the high pressure initiator at low temperatures. It has now been discovered that this can be accomplished by combining an alkyl aluminum compound with oxygen to provide a high pressure, low temperature catalyst for the polymerization of ethylene which is highly selective, effective and provides an easy means to control the polymerization reaction.

It is, therefore, the object of this invention to provide a novel initiator for the high pressure polymerization of ethylene. A further object of the invention is to provide a catalyst for the production of ethylene polymers at high pressures and low temperatures. These and other objects of the invention will become apparent from the following description.

According to this invention, ethylene is polymerized at elevated pressures and low temperatures in the presence of an initiator for the polymerization which is a mixture of an alkyl aluminum compound and an oxygen component. This is a standard, high pressure, free radical type polymerization which combines the advantages of a high pressure process to obtain a product closely resembling that of a low pressure type polymer.

In one of its most important aspects, the present invention can be considered as a method of effecting the low temperature polymerization of ethylene with an oxygen catalyst. Under normal conditions, oxygen alone will not cause substantial initiation of the ethylene polymerization except at temperatures of 160° C. and above. By the use of both an alkyl aluminum compound and oxygen, a method is provided for carrying out the polymerization at a much lower temperature, for example, a temperature at which substantially all the polymerization occurs below about 150° C.

The following examples are given to illustrate the invention but they are not introduced with the intention of unduly limiting the broad scope.

Example I

Triethyl aluminum in an amount to constitute about 25 parts per million of the total reactants was introduced into a purged pressure bomb which was then pressured to about 750 p.s.i. with ethylene and heated to 130° C. Ethylene containing sufficient oxygen to be about 25 parts per million of the entire contents was then pumped into the bomb until a pressure of 20,000 p.s.i. was obtained. The mechanical agitator inside the bomb was started when the ethylene containing oxygen was pumped into the bomb. The reaction was allowed to proceed under the conditions of 20,000 p.s.i. and 130° C. for approximately thirty minutes. At that time, the ethylene pressure was released and the resulting solid ethylene polymer was recovered. The polyethylene was soft and white and had the appearance and feel of any high pressure polyethylene. The rate of conversion was calculated to be one percent per hour. The density was determined to be 0.928 grams per cubic centimeter.

Example II

A run identical in procedure and conditions to Example I was conducted to check the reproducibility of the product produced. After a reaction time of approximately thirty minutes at 20,000 p.s.i. at 130° C., a polyethylene was recovered from the bomb in an amount to represent slightly less than 1 percent per hour conversion rate. The product density was found to be approximately the same as in Example I.

The oxygen can be added in separate increments at various steps of the reaction or it can be added at a continuous, gradual rate to achieve the desired polymerization rate. In the case of tubular reactors, it may be advantageous to add oxygen in one or more parts along the course of flow rather than add oxygen only at the inlet end.

Example III

A run identical in procedure and conditions to Example I except that diisopropyl peroxydicarbonate is substituted for oxygen as a constituent of the initiator. After a reaction time of approximately thirty minutes at 20,000 p.s.i. and 20° C., a polyethylene in an amount to represent approximately one percent conversion is recovered from the bomb. The product density is found to be approximately 0.950.

The polymerization procedure of the present invention has a number of important advantages. One of the foremost is that the polymerization can be initiated and carried out at low temperatures, that is, those not over about 150° C. but preferably not below about 0° C. An additional advantage in the case of tubular reactors is the feasability of adding oxygen catalyst separately. This avoids undesirable deposits in the inlet end of the reactor.

Controlling the temperature provides a method of controlling the density of the resulting polymer because the density bears an inverse relationship to polymerization temperature. If desired, however, polymerization can be effected at higher temperatures, up to 200° C. or even as high as 300° C., employing the alkyl aluminum and oxygen initiator disclosed herein and it is also possible to initiate the polymerization reaction at temperatures as low as —50° C. The broad range, therefore, within which the initiator of this invention is effective is from —50° C. to 300° C. Pressures may likewise be varied over a wide range. The reaction of ethylene to polyethylene can be catalyzed with the alkyl aluminum and oxygen initiator of the present invention at pressures as low as 5,000 p.s.i.

or at pressures as high as 50,000 p.s.i. However, the preferred range of pressure is from about 10,000 p.s.i. to about 40,000 p.s.i.

With the use of the catalyst of the present invention to control the polymerization, it is not necessary to employ a chain transfer agent such as an alkane having from three to six carbon atoms. However, the use of such agents may have certain advantages particularly at higher temperatures.

An alkyl aluminum compound is applicable in the process of the present invention but particularly suited are those in which the alkyl group or groups have one to ten carbon atoms and have a normal or forked chain or cyclic structures. Although trialkyl aluminum compounds are preferred in this invention, other alkyl aluminum compounds are contemplated as being useful. Furthermore, while trialkyl aluminum compounds in which all the alkyl groups are the same will ordinarily be employed for convenience, those containing two or three different alkyl groups are suitable. A few of the specific compounds which are suitable are for example: triethylaluminum, trimethylaluminum, tri-n-propylaluminum, triisopropylaluminum, tri-n-butyaluminum, tri-n-hexylaluminum, tri-n-octylaluminum, butyldiethylaluminum, tricyclohexylaluminum, diethylaluminum chloride and ethylaluminum dichloride.

Generally, the amounts of alkylaluminum can vary. For example, from about 5 to 200 parts per million parts of ethylene by mole at the lowest extremity or higher amounts of up to 500 parts per million by mole of the ethylene can be employed. Generally, an amount from about 10 parts per million to about 100 parts per million is preferred.

The oxygen catalyst component employed in this process will ordinarily be free oxygen. However, it is possible, and sometime advantageous, to employ other oxygen containing or oxygen generating compounds. The oxygen or peroxygen compounds suitable as oxygen components of the initiator hereinemployed include oxygen added as a component of gas such as air and peroxygen compounds, particularly organic peroxygen compounds, capable of generating free radicals when heated at a temperature below 150° C. such as hydrogen peroxide, dicumyl peroxide, benzoyl peroxide, lauroyl peroxide, diethyl peroxide, ditertiary butyl peroxide, diisopropyl peroxide, tertiary butyl perbenzoate and any other peroxide or peroxygen component capable of generating free radicals.

The amounts of oxygen or peroxygen components in the initiator can vary considerably. For example, the total amounts of oxygen can be in the range of about 5 parts by mole to 500 parts by mole per million parts of ethylene, although oxygen in the range of from 10 to 100 parts per million are preferred. To obtain the maximum benefits from delayed addition of oxygen it is desirable that the ethylene as charged, contain less than 5 parts per million of oxygen by mole and the delayed oxygen addition can suitably be effected by adding oxygen in ethylene or some other medium comprising more than 500 parts per million by mole of the reactor contents.

The oxygen and peroxygen compound is suitably employed in amounts which are approximately equal to the mole quantities of the alkyl aluminum compound. However, it is possible to use smaller amounts of oxygen but conversion rates are undesirably slow. Amounts of oxygen substantially greater than equimolar quantities of alkyl aluminum are also effective but there is some loss of catalyst with the use of excess oxygen. Generally, amounts of oxygen from about 0.5 to 1.5 moles per mole of alkyl aluminum will be employed and are preferred in most applications. However, it is possible to use amounts of oxygen from about 0.1 mole to 3 moles per mole of alkyl aluminum employed.

Regulating the rate of addition of the oxygen is an effective method to control the polymerization reaction. Thus in the presence of sufficient amounts of alkyl aluminum to effect a rapid uncontrolled polymerization of ethylene, it is possible to control the oxygen addition so as to effect an efficient and reasonably rapid conversion of the ethylene to polyethylene. The controlled addition of oxygen will be especially desirable when relatively high amounts of alkyl aluminum are employed. While the effectiveness of heat transfer systems and other factors will have a considerable influence upon the alkyl alumination concentration, the use of controlled addition of oxygen will ordinarily be most useful for polymerizaiton in which the amount of alkyl aluminum exceeds about 10 parts per million by mole of the ethylene. The regulated addition of oxygen also provides a precise control of polymerization temperature, making it possible to conduct almost the entire polymerization within a few degrees of a particular temperature.

While this invention is particularly concerned with the polymerization of ethylene to produce a homopolymer, it is also contemplated to utilize small amounts of other monomers along with the ethylene in preparing copolymers of ethylene.

While the examples and the description have generally been concerned with a batch poymerization, it is, of course, possible to conduct a continuous polymerization in, for example, an autoclave or tubular type reactor. Polymers formed according to the present invention will be useful in molding resins and for other purposes such as pipe construction, molding of semi-rigid articles, and bottle manufacture. These polymers will also have certain specialized uses in high temperature and electrical insulation applications. These polymers will also be extremely desirable when employed in the formation of films for wrappings and other purposes.

We claim:
1. A process for producing normally solid polymers of ethylene which comprises polymerizing ethylene at pressures at about 5,000 p.s.i. to about 50,000 p.s.i. and at temperatures from about −50° C. to about 300° C. in the presence of from about 10 p.p.m. to about 1,000 p.p.m. by mole based on ethylene of an initiator consisting of an alkyl aluminum compound and an oxygen containing component selected from the group consisting of oxygen and peroxygen compounds capable of generating free radicals under said reaction conditions and constituting from about 0.1 mole to about 3 moles per mole of alkyl aluminum employed.

2. The process of claim 1 wherein the alkyl aluminum compound is a trialkylaluminum in which the alkyl groups contain from one to ten carbon atoms.

3. The process of claim 1 wherein the oxygen containing component is free oxygen.

4. The process of claim 1 wherein the oxygen containing component is a peroxygen compound.

5. A process for producing normally solid polymers of ethylene which comprises polymerizing ethylene at a pressure from about 10,000 p.s.i. to about 40,000 p.s.i., a temperature from about 0° C. to about 150° C. and in the presence of from about 20 parts per million to about 200 parts per million by mole based on the ethylene of an initiator consisting of triethylaluminum and free oxygen in which the oxygen is present in an amount from about 0.5 mole to about 1.5 moles per mole of triethylaluminum.

References Cited by the Examiner

UNITED STATES PATENTS

| | | | |
|---|---|---|---|
| 2,699,457 | 1/55 | Ziegler | 260—683.15 |
| 3,052,661 | 9/62 | Benning | 260—89.1 |
| 3,053,882 | 9/62 | Benning | 260—89.1 |

JOSEPH L. SCHOFER, *Primary Examiner.*